(12) United States Patent
Findlay et al.

(10) Patent No.: US 10,876,191 B2
(45) Date of Patent: Dec. 29, 2020

(54) CARTRIDGE CASE INDUCTION ANNEALING APPARATUS

(71) Applicant: AMP Annealing Limited, Bombay (NZ)

(72) Inventors: Alexander Findlay, Auckland (NZ); Matthew A. Findlay, Auckland (NZ)

(73) Assignee: AMP Annealing Limited, Auckland (NZ)

( * ) Notice: Subject to any disclaimer, the term of this patent is extended or adjusted under 35 U.S.C. 154(b) by 384 days.

(21) Appl. No.: 15/468,545

(22) Filed: Mar. 24, 2017

(65) Prior Publication Data

US 2017/0198378 A1 Jul. 13, 2017

Related U.S. Application Data

(63) Continuation of application No. 14/045,684, filed on Oct. 3, 2013, now Pat. No. 9,631,251.

(Continued)

(51) Int. Cl.
*H05B 6/10* (2006.01)
*H05B 6/36* (2006.01)
*H05B 6/40* (2006.01)
*C22F 1/08* (2006.01)
*C21D 1/42* (2006.01)
*C21D 9/08* (2006.01)

(Continued)

(52) U.S. Cl.
CPC ............... *C22F 1/08* (2013.01); *C21D 1/42* (2013.01); *C21D 9/08* (2013.01); *F42B 33/00* (2013.01); *H05B 6/101* (2013.01); *H05B 6/365* (2013.01); *H05B 6/40* (2013.01); *H05B 6/44* (2013.01); *C21D 9/10* (2013.01); *F42B 5/28* (2013.01); *Y02P 10/25* (2015.11)

(58) Field of Classification Search
CPC .......... H05B 6/40; H05B 6/365; H05B 6/101; H05B 6/44; C22F 1/08; C21D 1/42; C21D 9/08; C21D 9/10; Y02P 10/253; F42B 5/28; F42B 33/00
USPC ....... 219/643, 642, 635, 614, 650, 658, 660, 219/670; 425/174.8 R, 3, 114, 446, 79; 264/486, 317
See application file for complete search history.

(56) References Cited

U.S. PATENT DOCUMENTS 5,374,809 A * 12/1994 Fox .................. B23D 65/00
148/573
9,631,251 B2 * 4/2017 Findlay .............. H05B 6/365

FOREIGN PATENT DOCUMENTS

EP 2104207 A1 * 9/2009 ............. H02K 15/12

* cited by examiner

*Primary Examiner* — Quang T Van
(74) *Attorney, Agent, or Firm* — Finnegan, Henderson, Farabow, Garrett & Dunner, LLP

(57) ABSTRACT

The present disclosure relates to an induction annealing apparatus adapted to anneal cartridge cases to improve their reusability. In one implementation, the apparatus includes a power supply unit and a plurality of annealing units, each including a magnetic core having ends separated by an air gap. An induction coil is wound around the magnetic core to generate a magnetic field in the air gap. A cartridge case holder holds the cartridge case such that the neck of the cartridge case is positioned in one of the air gaps. The power supply unit selectively connects to the annealing units to supply power for a predetermined length of time, and the size of the air gap of the magnetic cores of each of the annealing units may differ. In other implementations, the size of the air gap may be adjustable, and a temperature sensor or a ferrite stake may be included.

13 Claims, 9 Drawing Sheets

Related U.S. Application Data

(60) Provisional application No. 61/731,431, filed on Nov. 29, 2012.

(51) Int. Cl.
*F42B 33/00* (2006.01)
*H05B 6/44* (2006.01)
*C21D 9/10* (2006.01)
*F42B 5/28* (2006.01)

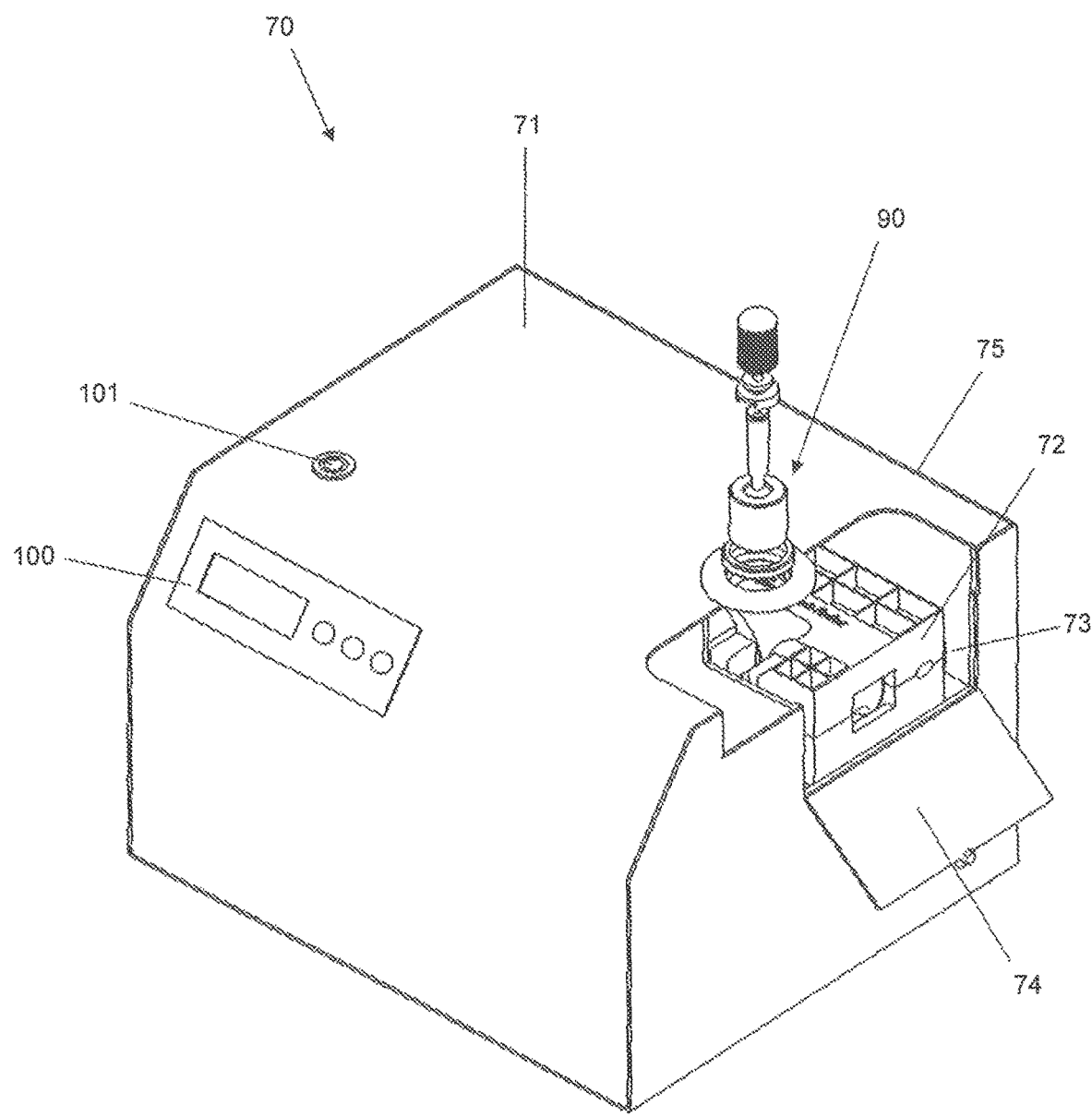

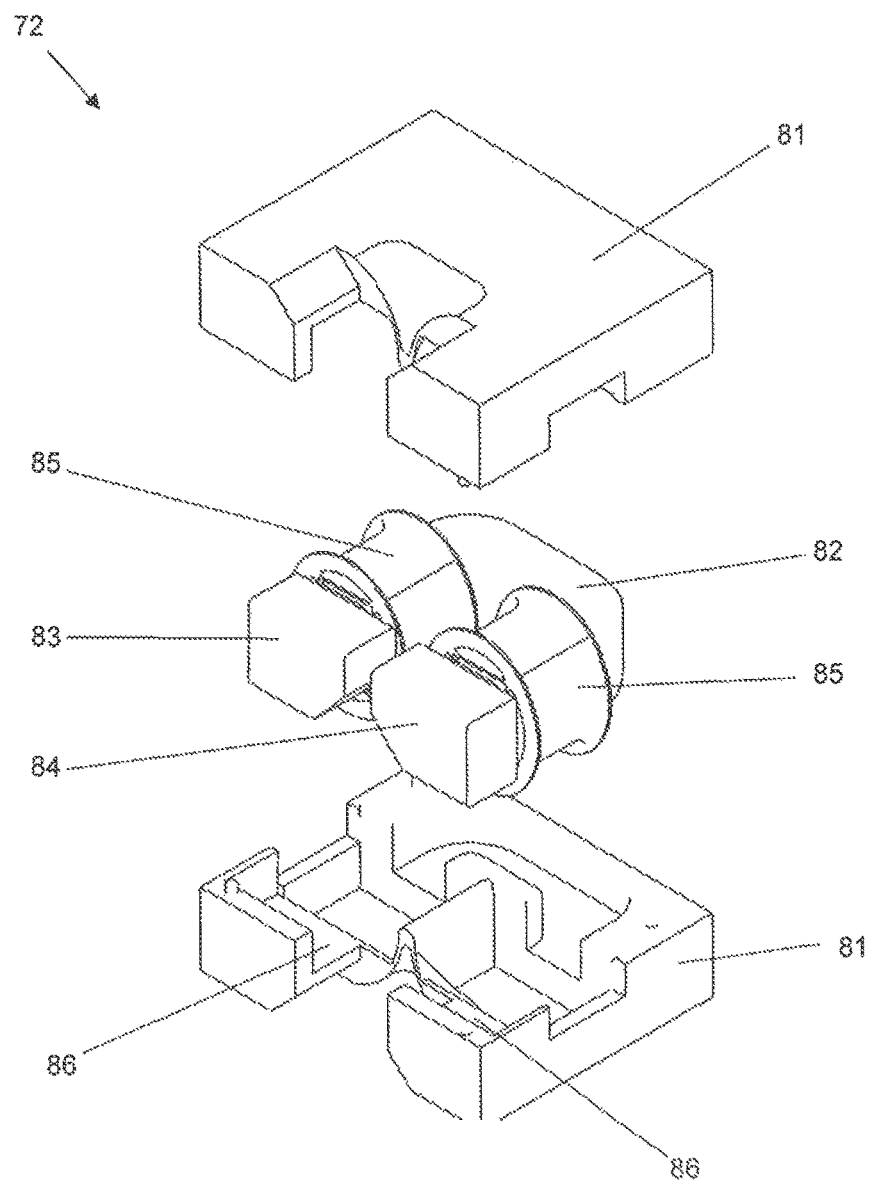

CARTRIDGE CASE INDUCTION ANNEALING APPARATUS

This application is a continuation of U.S. application Ser. No. 14/045,684, filed Oct. 3, 2013, which claims priority to U.S. Provisional Application No. 61/731,431, filed Nov. 29, 2012, both of which are incorporated herein by reference.

FIELD OF INVENTION

The invention relates generally to induction annealing and more specifically to an apparatus or system for induction annealing brass cartridge cases.

BACKGROUND TO THE INVENTION

The brass cartridge cases of rifle ammunition are reusable and many shooters reload their cases by resizing, repriming, and recharging the cartridges with powder, and reseating a new projectile. Reloading can be economic because it can provide a shooter with more ammunition and higher quality ammunition for a given budget. Reloading also allows shooters to customise the ammunition to their individual requirements, for example to suit their needs of accuracy, bullet-type or velocity.

The brass case may often be the most expensive component of a cartridge and therefore it is advantageous to re-use it as many times as possible. The process of resizing and reseating bullets in the case work hardens the neck of the case, which can result in an increase in neck tension and therefore increased chamber pressure. Work hardening can also cause the neck to become brittle or to crack as the brass loses its malleability. A work hardened case may be unable to survive swaging back into shape during the process of resizing.

The effects of work hardening can be alleviated by annealing, which makes brass softer and less brittle. Annealing involves heating a substance to a specified temperature for a specified length of time and then allowing the substance to cool. There are complexities in annealing a cartridge case because the heating must be localised at the neck of the case. The head of the case must avoid being annealed and remain hard because if it is overly softened the case will be unsafe to use.

Conventional ways of annealing cartridge cases include applying heat to the neck using gas burners or a molten alloy of lead. The temperature in the rest of the case may be controlled by standing the case in water. However these techniques have inherent repeatability and safety issues. Heating the neck with a torch makes it difficult to evenly heat all of the neck. These techniques are also not easily repeatable from case to case but repeatability is required for consistent results.

Induction annealing is the process of annealing by the application of heat to metal by electromagnetic induction. Currents are induced in the metal, which is resistively heated. Induction annealing is used at the industrial level of case manufacturing but it has not been available as a practical option for the domestic reloader because of the complexities in tailoring induction annealing equipment to the requirements of individual cartridge cases.

It is an object of the invention to provide an apparatus for induction annealing a neck of a cartridge case. There is a need for an induction annealing apparatus suitable for non-industrial purposes, for example, use domestically.

Alternatively, it is an object of the invention to at least provide the public with a useful choice.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

One aspect of the disclosure provides a system for induction annealing a neck of a cartridge case. The system may comprise a power supply unit comprising a power supply controller. The system may comprise a plurality of annealing units. Each annealing unit may comprise a magnetic core having a first end and a second end separated by an air gap. Each annealing unit may comprise an induction coil wound around the magnetic core and configured to generate a magnetic field in the magnetic core and the air gap. Each annealing unit may comprise a power supply connector electrically connected to the induction coiL The system may further comprise a cartridge case holder for holding the cartridge case such that the neck of the cartridge case is positioned in one of the air gaps. The power supply unit may be configured to be selectively electrically connected to the power supply connector of any one of the annealing units. The power supply controller may be operable to supply power to the annealing unit connected to the power supply unit for a predetermined length of time, and the size of the air gap of the magnetic cores of each of the annealing units may differ.

Another aspect of the disclosure provides for an apparatus for induction annealing a neck of a cartridge case. The apparatus may comprise a magnetic core having a first end and a second end separated by an air gap, wherein the configuration of the magnetic core is adjustable to adjust the size of the air gap. The apparatus may comprise an induction coil wound around the magnetic core and configured to generate a magnetic field in the magnetic core and the air gap. The apparatus may comprise a cartridge case holder for holding the cartridge case such that the neck of the cartridge case is positioned in the air gap. The apparatus may comprise a power supply controller operable to connect the induction coil to an electric power source for a predetermined length of time.

A further aspect of the disclosure provides an apparatus for induction annealing a neck of a cartridge case. The apparatus may comprise a magnetic core having a first end and a second end separated by an air gap, wherein the configuration of the magnetic core is adjustable to adjust the size of the air gap. The apparatus may further comprise an Induction coil wound around the magnetic core and configured to generate a magnetic field in the magnetic core and the air gap. The apparatus may further comprise a cartridge case holder for holding the cartridge case such that the neck of the cartridge case is positioned in the air gap. The apparatus may further comprise a temperature sensor configured to monitor the temperature of the cartridge case when positioned in the cartridge case holder. The apparatus may further comprise a power supply controller operable to connect the Induction coil to an electric power source and to disconnect the Induction coil from the electric power source when the temperature sensor detects that the temperature of the cartridge case has reached a predetermined temperature.

A still further aspect of the disclosure provides a cartridge case annealing unit. The cartridge case annealing unit may comprise a magnetic core having a first end and a second end separated by an air gap, wherein the configuration of the magnetic core is adjustable to adjust the size of the air gap. The cartridge case annealing unit may comprise an induction coil wound around the magnetic core and configured to generate a magnetic field in the magnetic core and the air gap. The cartridge case annealing unit may comprise a power supply port operable to connect the induction coli to a power supply unit and to electrically connect an electric power source to the induction coil for a predetermined length of time. The cartridge case annealing unit may comprise a housing in which the magnetic core, induction coil and power supply port are housed.

A still further aspect of the disclosure provides an apparatus for induction annealing a neck of a cartridge case. The apparatus may comprise a magnetic core having a first end and a second end separated by an air gap. The apparatus may comprise an induction coil wound around the magnetic core and configured to generate a magnetic field in the magnetic core and the air gap. The apparatus may comprise an elongate magnetic member, at least a part of which is positioned in the air gap in a direction substantially perpendicularly to a line between the first and second ends of the magnetic core. The apparatus may comprise a cartridge case holder for holding the cartridge case such that the neck of the cartridge case is positioned in the air gap and the elongate magnetic member is positioned inside the neck of the cartridge case. The apparatus may comprise a power supply controller operable to connect the induction coil to an electric power source for a predetermined length of time.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

One or more embodiments of the Invention will be described below by way of example only, and without intending to be limiting, with reference to the following drawings, in which:

FIG. 8 is a perspective illustration of the system of FIG. 7 with a part of the housing cut away; and FIG. 9 is an exploded perspective view illustration of the annealing unit shown in FIG. 7.

DETAILED DESCRIPTION OF PREFERRED EMBODIMENTS OF THE INVENTION

In general terms, the invention relates to an induction annealing apparatus able to anneal cartridge cases to improve their reusability. The invention provides an apparatus that is suitable for non-industrial use, for example at home by the reloader hobbyist.

As will be explained, an induction annealing unit or system according to embodiments of the invention is capable of being used to anneal cartridge cases of varying types and sizes. Different cases require an induction annealing apparatus to be set up differently to effectively perform the annealing process. The exemplary induction annealing units described herein are capable of being adjusted to cater for the different requirements.

Overview of an Apparatus According to One Embodiment

Figure 1:
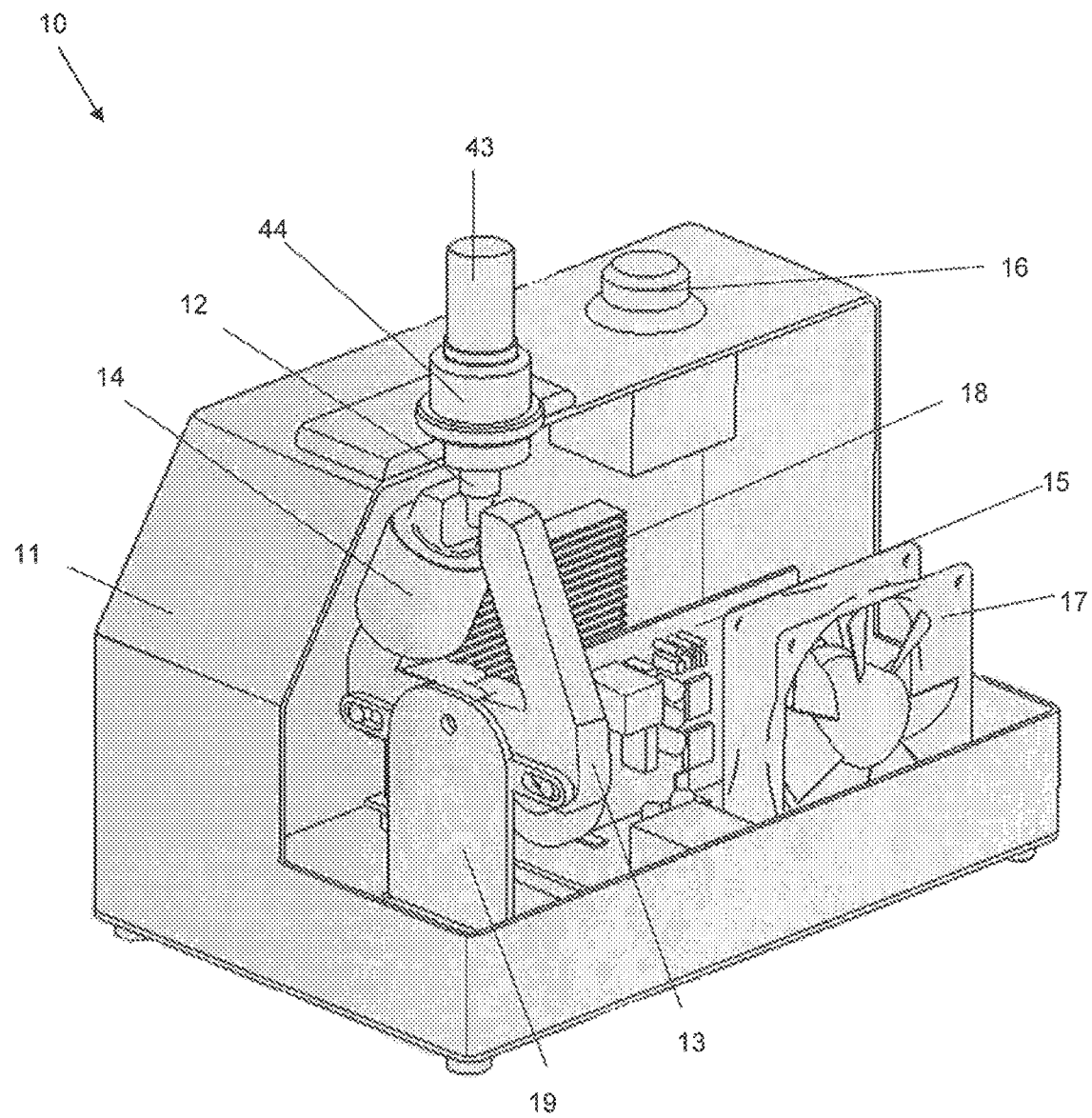
FIG. 1 is a cross-sectional, isometric view of an Induction annealing apparatus according to an embodiment of the invention.

FIG. 1 is a cross-sectional, isometric view of an induction annealing apparatus 10 according to an embodiment of the invention. Induction annealing apparatus 10 comprises a housing 11 within which many of the components of the apparatus are housed.

Inside housing 11 is a magnetic core 13 which defines an air gap between two ends of the core. Around the magnetic core is wound an induction coil 14, which comprises one or more windings of electrically conducting material such as Litz wire. The induction coil 14 is electrically connected to an alternating current power source such that, when energised, a magnetic field is induced in the magnetic core 13 and across the air gap between its ends.

The apparatus 10 comprises a holder for a cartridge case 12 in which the case can be positioned so that the neck of the case is positioned in the air gap defined by the ends of magnetic core 13. In the embodiment of FIG. 1, the case holder comprises a hole in housing 11 into which the case 12 may be Inserted and held in the desired place by components to be described further below.

The size of the air gap between the ends of the magnetic core 13 is able to be adjusted to accommodate cartridge cases having differing diameter necks. It is generally desirable for the air gap between the ends of the magnetic core 13 to be as small as possible whilst still being large enough for the case to be annealed to fit inside the gap without touching the magnetic core. The larger the air gap, the longer the annealing process takes and the higher the risk that parts of the case other than the neck may be annealed and softened. It Is therefore important to control the size of the air gap in the magnetic core to reduce the dangers caused by softening parts of the case other than the neck. Examples of the manner in which the size of the air gap can be varied are discussed below.

The apparatus 10 further comprises one or more controllers for controlling the operation of the apparatus and its components. The controller may be embodied in any suitable manner, for example it may take the form of control circuitry 15. For the purposes of this specification, the functional capabilities of the apparatus will be described without detailed reference to the components used to implement those capabilities. Those skilled in the art will appreciate that the functionality of induction annealing apparatuses according to the invention may be implemented using any appropriate electronic hardware componentry, through computer software executed by one or more processors, or combinations of both.

A user interface may be provided for control of the induction annealing apparatus 10. The user interface may comprise any appropriate combination of buttons, switches, displays, touch-screens and the like for controlling and adjusting the operation of the apparatus. In the embodiment shown in FIG. 1, an activation switch 16 is provided on the top of housing 11. Other controls may also be provided and, where the operation of the apparatus is described herein with reference to the ability to control or adjust the operation, it will be apparent to the skilled addressee that a suitable user interface element(s) may be provided to provide a user with that control/adjustment ability.

In the embodiment shown in FIG. 1, the activation switch 16 and control circuitry 15 are located sufficiently far from the induction coil 14 to avoid any electrical interference which may occur between them and may affect the operation of the annealing apparatus, for example if undesired currents are induced in the induction coil 14. The distance between the components required to minimise such electrical interference will differ depending on the characteristics of the respective annealing apparatus but will be able to be determined by the skilled addressee without undue experimentation.

In alternative embodiments, the apparatus may comprise electrical shielding positioned between the induction coil 14 and other components that have the potential to electrically interfere with the coil.

Other components such as a fan 17 or a vent 18 in the walls of housing 11 may also be provided to cool the operative components of the apparatus 10.

Magnetic Core

Figure 2:
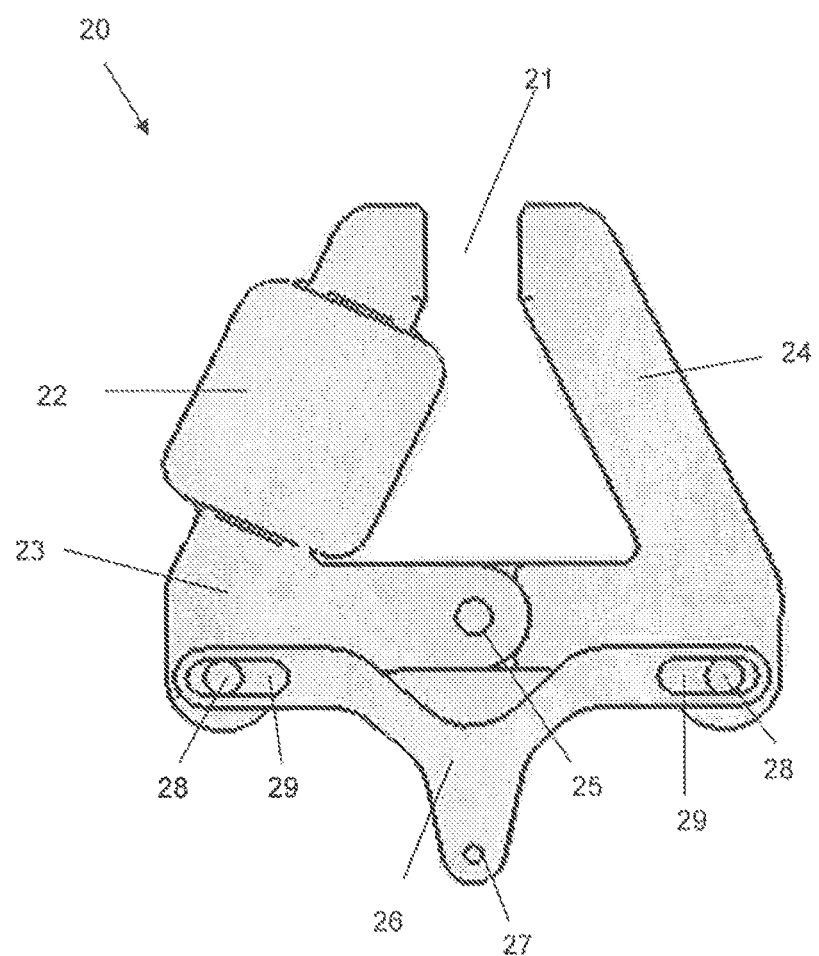
FIG. 2 is a side view illustration of a magnetic core according to one embodiment of the invention.
Figure 3:
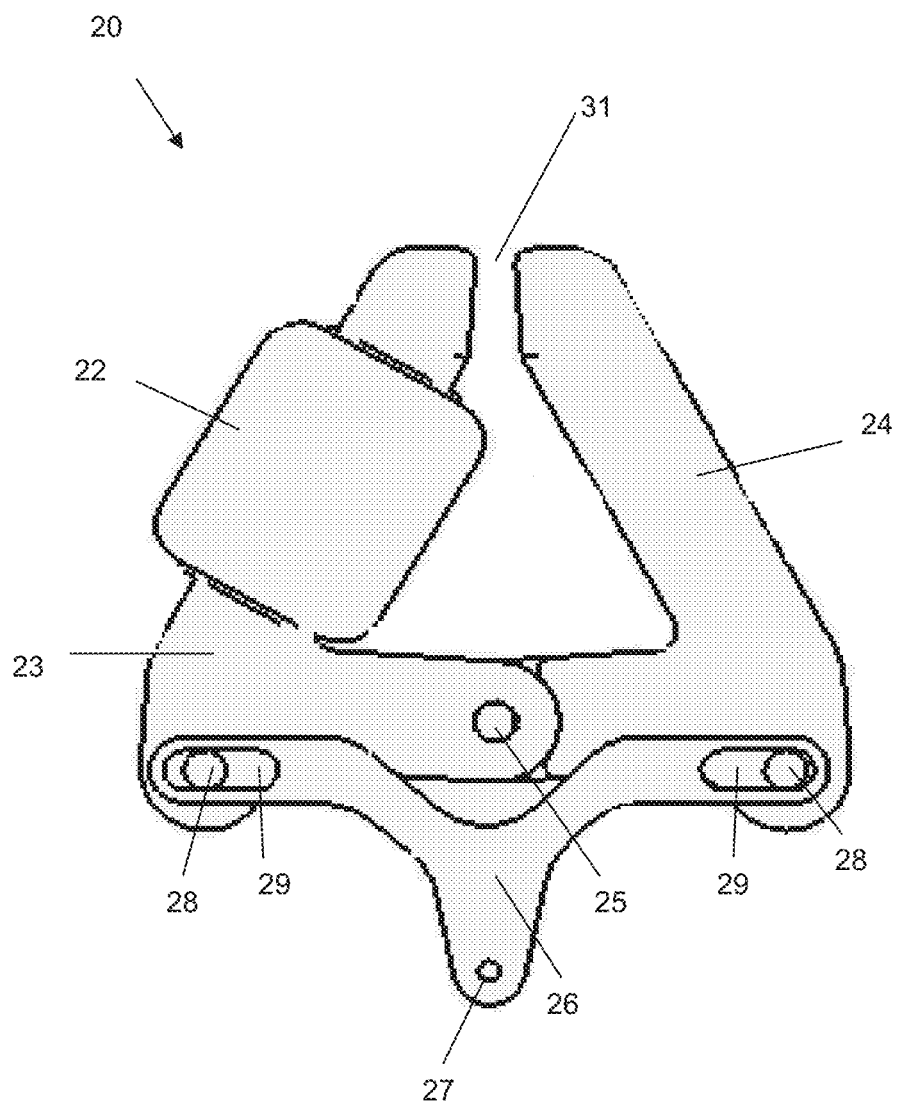
FIG. 3 is another side view illustration of the magnetic core shown in FIG. 2.

The features and operation of a magnetic core for an induction annealing apparatus according to an embodiment of the invention will now be described in further detail with reference to FIGS. 2 and 3, which are side view illustrations of a magnetic core 20 according to one embodiment of the invention. The magnetic core 20 illustrated in FIGS. 2 and 3 is similar to magnetic core 13 shown in FIG. 1 and it operates in a similar manner.

Magnetic core 20 is made from a magnetically permeable material, for example a ferrimagnetic material like ferrite or a ferromagnetic material like iron. The shape of the core may be any shape in which two ends define between them an air gap 21. In the embodiments of FIGS. 1-3, the core is triangular-shaped with an air gap at one of the corners of the triangle. In other embodiments, the magnetic core may be C-shaped or U-shaped, for example.

Around one part of the core is wound an induction coil 22. Alternating current is passed through the coil 22 and this generates a magnetic field in the core 20. The magnetic field lines are concentrated within the core because it is made from a magnetically permeable material. The magnet field lines span the air gap 21 between the two ends of the magnetic core 20. The ends of the core 20 may be substantially planar and parallel to each other so that the magnetic field lines are substantially parallel across air gap 21 and the magnetic field is uniform in the space between the ends of the core.

Magnetic core 20 comprises two magnetic core members 23, 24 which are angled lengths of magnetically permeable material joined together at pivotal connection 25. The ends of core members 23 and 24 that are pivotally connected together may each comprise a longitudinal extension across half the width of the core member, with the longitudinal extensions mating and being pivotally connected together. This arrangement is also shown in FIG. 1 for magnetic core 13. With this arrangement, the magnetic core members can pivot relative to each other while the cross-section of magnetically permeable material through the pivotal connection is a high proportion of the cross-section of each member at a point adjacent to the pivotal connection. This tends to minimise the energy losses caused by disruption to the uniformity of the magnetic core along its length.

Core members 23, 24 can pivot relative to each other, which moves the ends of the core members relative to each other, thus varying the width of the air gap 21. FIG. 2 shows the magnetic core 20 in one configuration in which the air gap 21 has a first width. FIG. 3 shows the magnetic core 20 in a second configuration with an air gap 31 which has a smaller width than the air gap 21. While the surfaces of the ends of the core members 23, 24 at the air gap 31 are not parallel in the configuration shown in FIG. 3, the triangular shape of the magnetic core 20 maintains the surfaces close to parallel and this maintains a good level of uniformity of the magnetic field lines across the air gap 31.

While the orientation of one or both of the core members 23, 24 could be adjusted individually, either manually or by an appropriate actuation device, in the embodiment shown in FIGS. 1-3, a lever 26 (or 19 in FIG. 1) may be provided to pivotally rotate the magnetic core members relative to each other. In the embodiment shown in FIGS. 2 and 3, lever 26 comprises two arms which are connected to knobs 28 extending outwards from core members 23, 24. Knobs 28 co-operate with slots 29 in the arms of lever 26. Movement of lever 26 upwards and downwards causes knobs 28 to slide back and forth along slots 29, thus pivoting the magnetic members 23, 24 and altering the width of the air gap 21, 31 between their ends.

Movement of lever 26 may be controlled by any appropriate mechanism, either mechanical or electrical. For example, a magnetic core member actuator may be coupled to the lever 26 via hole 27. The actuator may be operable to move the lever up and down to control the size of the air gap 21, 31.

The induction annealing apparatus may comprise a control mechanism by which a user can control the size of the air gap 21, 31 between the magnetic core members. Operation of the control mechanism may cause the actuator to move lever 26 to control the size of the air gap. The control mechanism may be controlled via a user interface, which may allow the user to select an air gap size or a setting which corresponds to an air gap size. The control mechanism may be electronically or mechanically operated. For example, in one embodiment, the user may be able to select a setting number using appropriate buttons and an appropriate actuator, such as a servomechanism, moves the lever so that the core members are separated by an air gap size corresponding to that setting. In another embodiment, the control mechanism is operated manually, for example turning a dial may cause the lever 26 to move up or down and therefore control the size of the air gap. Markings on the dial may indicate to the user the size of the air gap.

In another embodiment of the invention, the magnetic core comprises one or more removable portions at the ends of the magnetic core defining the air gap. The removable portions may be able to be replaced with alternative magnetic core portions that, when positioned appropriately in relation to permanent sections of the magnetic core, define air gaps of differing sizes. To adjust the size of the air gap, the appropriate replacement magnetic core portion is selected and inserted into position. When in an operating position, the removable portions may comprise sections of the magnetic core which abut against the permanent sections of the magnetic core such that the region of abutment contains minimal gaps and has as a substantially uniform cross-section. This reduces energy losses in the magnetic core. Removable portions of each magnetic core member may be fixed together in some manner by a non-magnetically permeable member such that, when positioned on top of the permanent section of the respective permanent magnetic core member, they support each other in position.

Overview of an Apparatus According to One Embodiment

In the embodiment of the invention described above the air gap defined by the magnetic core can be altered by moving two portions of the magnetic core relative to each other. In other embodiments of the invention, the size of the air gap in a magnetic core can be varied in another way, an example of which will now be described.

Figure 6:
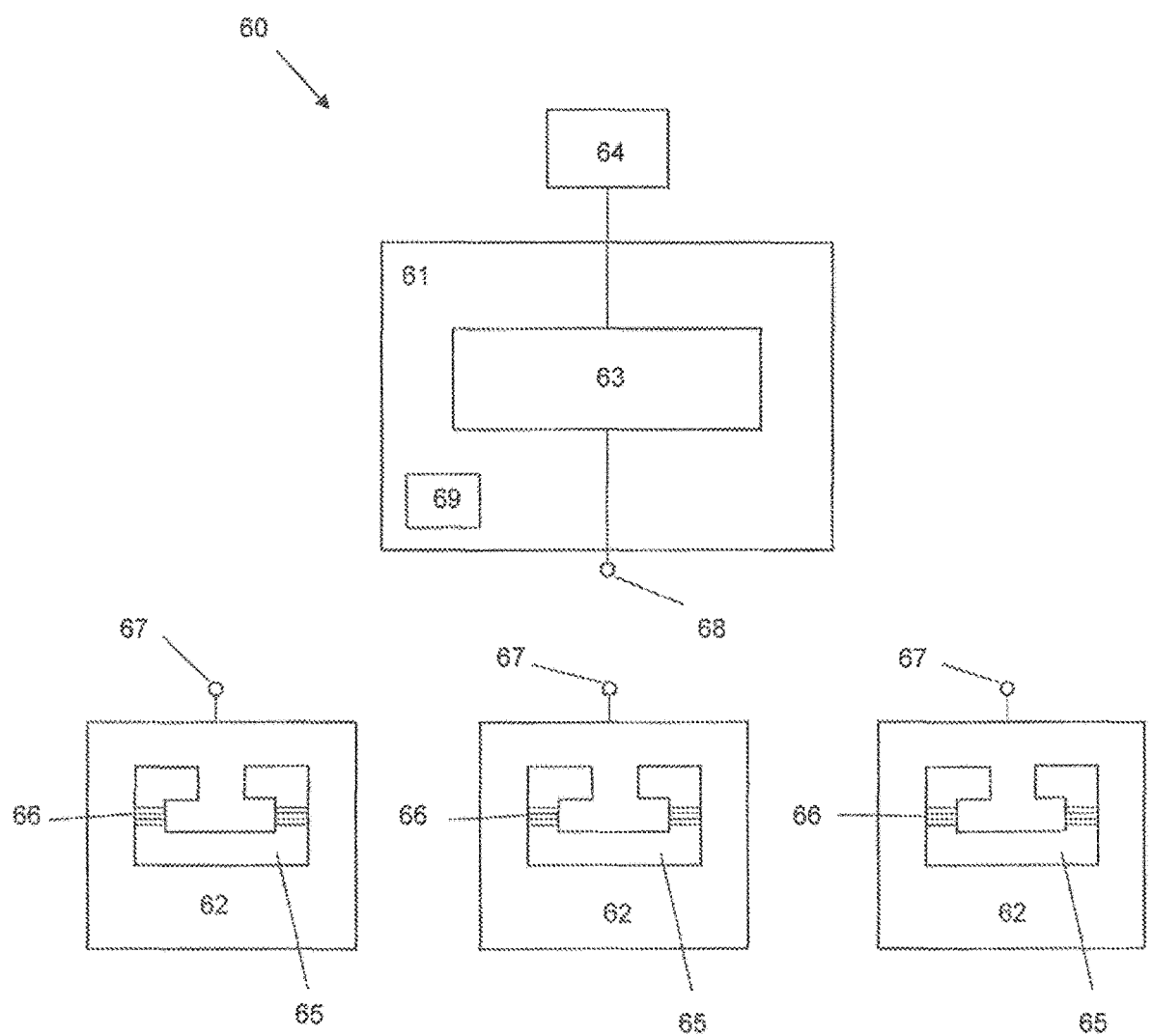
FIG. 6 is a schematic view illustration of a system for induction annealing a neck of a cartridge case according to an embodiment of the invention.

FIG. 6 is a schematic view illustration of a system 60 for induction annealing a neck of a cartridge case according to an embodiment of the invention. Not all components of system 60 are shown in FIG. 6.

In system 60, a master unit 61 is able to be connected to one of a plurality of annealing units 62. The annealing units 62 comprise magnetic cores with air gaps of differing sizes. For example, in one embodiment of the invention, one of the annealing units has a magnetic core with an air gap of 13 mm while another annealing unit has a magnetic core with an air gap of 16 mm. Other annealing units have air gaps of other sizes. In use, the annealing unit with the desired air gap can be selected and connected to the master unit 61.

Master unit 61 may also be referred to as the power supply unit 61. It contains a power supply controller 63 able to control the power supply from the power supply unit 61 to supply power to a power outlet 68 for a predetermined length of time. For example, power supply controller 63 may comprise a switch controlled by a processor configured to close the switch for a period of time determined by a user-generated input, such as via a control interface 69. It will be understood that power supply controller 63 is able to be connected to a power supply 64, for example using a mains voltage plug or any other appropriate mechanism.

Each annealing unit 62 comprises a magnetic core 65 defining an air gap and an induction coil 66 wound around the respective magnetic core 65. The induction coil 66 of each annealing unit 62 can be electrically connected to power supply 64 by means of being connected to power supply controller 63. When an alternating current is passed through the induction coil 66 a magnetic field is generated in the respective magnetic core 65 and in the air gap it defines.

The annealing units 62 each comprise a power supply connector 67 configured to connect a selected annealing unit to the power outlet 68 of the power supply unit 61. The annealing units can therefore be interchangeably connected to the power supply unit 61 so that the air gap having the desired size for annealing the cartridge case can be selected.

There will now be described exemplary physical characteristics of an induction annealing system such as shown schematically in FIG. 6 with reference to FIG. 7, which is a perspective view illustration of a system 70 for induction annealing a neck of a cartridge case according to another embodiment of the invention, FIG. 8, which is a perspective illustration of the system 70 with a part of the housing cut away, and FIG. 9, which is an exploded perspective view illustration of the annealing unit 72 shown in FIG. 7.

Typically, power supply unit 71 comprises a housing 75 in which the power supply controller and other components are accommodated. Housing 75 comprises a structure enabling the power supply unit 71 to mate with each of the annealing units 72, one at a time. In the embodiment of FIG. 7, housing 75 comprises a port 73 into which one of the annealing units 72 can be inserted. Port 73 may be covered by an openable door or panel 74 to protect the components inside housing 75 when not in use. Port 73 has dimensions suitable for receiving the annealing unit.

Figure 7:
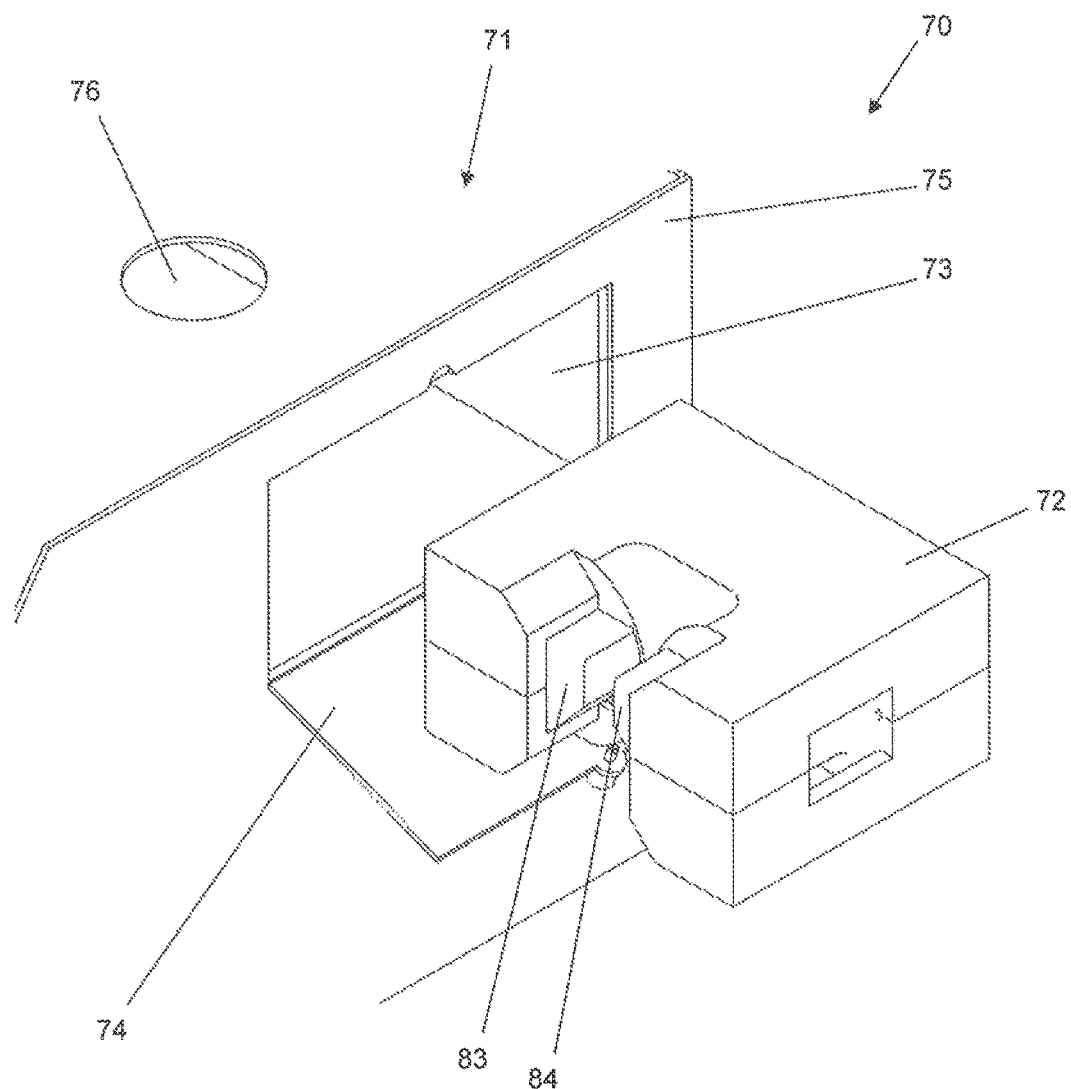
FIG. 7 is a perspective view illustration of a system for induction annealing a neck of a cartridge case according to another embodiment of the invention.

Inside port 73, and not shown in FIG. 7 or 8, is a power supply connector configured to connect to a power supply connector on the annealing unit (also not shown in FIG. 7 or 8). The physical structure of the inside of port 73 and the exterior wall of the annealing unit 72 may help to facilitate this connection. For example, there may be a male-female connection structure or plug arrangement. The electrical connection between the power supply unit 71 and the annealing unit 72 may be made through the same mating arrangement or the mating arrangement and electrical connection may be separate. It will be understood that of importance is the ease with which a user can insert the annealing unit 72 into the port 73 to position the annealing unit correctly and to make the electrical connection. In one embodiment, the mating arrangement may provide the user with feedback that the annealing unit has been positioned correctly, for example through tactile feedback, a click connection or a visual indication.

In the embodiment shown in FIGS. 7 and 8, the housing 75 comprises a hole 76. The hole is positioned such that, when an annealing unit 72 is in the mating position with the annealing unit (i.e. inserted through port 73 in the embodiment of FIG. 7), a cartridge case can be inserted through the hole 76 such that the neck of the cartridge case is positioned in the air gap defined by the magnetic core of the annealing unit 72. It will be appreciated that the position of hole 76 will depend on the size of the annealing units and the orientation in which they are able to be put into mating arrangement with the power supply unit, and therefore the exact position of the hole may differ in different embodiments of the invention. Hole 76 may form a mounting point for a cartridge case holder 90 as will be described further below.

As shown in FIG. 9, each annealing unit 72 comprises housing parts 81 configured to connect together to house components inside. Inside the housing are magnetic core parts 82, 83 and 84, bobbins 85 and coils of electrical conductors (e.g. Litz wire), not shown in FIG. 9.

The magnetic core may be formed from one or more parts. In the embodiment of FIG. 9 the magnetic core is formed from a U-shaped magnetic member 82 and two magnetic tips 83, 84. The magnetic core parts 82, 83 and 84 are made from magnetic material such as ferrite. They are positioned with the magnetic tips 83 and 84 in contact with the ends of the U-shaped member 82 such that the tips and U-shaped member are magnetically connected. Interior mouldings in the housing 81 may assist with positioning the magnetic core parts accordingly.

Manufacturing the magnetic core out of separate parts may enable the same parts to be used in different annealing units in which the air gap defined by the magnetic core differs in size. This reduces the cost and complexity of manufacturing the magnetic core or obtaining the parts from suppliers. For example, magnetic cores of the same type can be used in all annealing units, and the same type of magnetic tips 83, 84 can also be used in all annealing units. The differing sized air gap between annealing units can be achieved by positioning the magnetic tips differently with respect to the magnetic core, i.e. at different positions along a line perpendicular to the open ends of the U-shaped member. The housing 81 of each annealing unit may comprise channels 86 that allow the position of the magnetic tips 83, 84 to differ between annealing units. In one embodiment, the same form of housing is used for each annealing unit with the magnetic tips positioned in different places within the channels. This enables a single moulding to be used for the housing but the magnetic tip must be held in place by some means, for example with an extra housing component or using glue. In another embodiment, the housing for each annealing unit may be moulded differently depending on the desired position of the magnetic tips so that the body of the housing can be used to hold the tips in place.

Bobbins 85 are used to wind the wire induction coil around and hold it in place around the arms of the magnetic core. In other embodiments the induction coil wire may be wound directly around the magnetic core, but the use of the bobbins may be beneficial for the manufacturing process since the bobbins can be pre-wound with wire. In the embodiment shown in FIG. 9, the end of the bobbins is flush with the interface between the magnetic tips 83, 84 and the U-shaped member 85.

In another embodiment of the invention, the annealing units are configured to plug into the outside of power supply unit and the power supply unit comprises a port or socket mounted on an exterior surface. In such an embodiment the cartridge case holder is mounted externally to the power supply unit.

In other embodiments, the annealing units may comprise the cartridge case holder, for example the annealing unit housing may comprise a hole located above the magnetic core such that the cartridge case may be inserted through the hole and held in place with the neck in the magnetic core air gap.

Embodiments of the invention in which the magnetic core Is housed separately from the power supply I control electronics, such as has been described in relation to FIGS. 6-9, may help shield the magnetic field created in the annealing unit from any magnetic interference created by the power supply/control electronics.

Further features of the invention will now be described with reference to the embodiment of FIG. 1. It will be understood that many of these features are also relevant to, or may be applied in relation to, the embodiment of the invention shown in FIGS. 6-9, and embodiments of the invention will be taken to include combinations of features hereinafter described and features of the embodiments of FIGS. 6-9, even if they are not explicitly described.

Timing Control

Effective annealing of a cartridge case neck requires heat to be applied for a certain length of time. If the heat is applied for too long, the neck will be overly softened but if the heat is not applied for long enough, the neck will remain brittle. For any given cartridge neck there is a relatively small tolerance for the amount of time for heat to be applied for annealing to be effective so accurately controlling the duration of heating is important In the embodiment of the invention shown in FIG. 1, control circuitry 15 comprises a power supply controller which is operable to connect the induction coil to the electric power source for a predetermined length of time, which can be varied by the power supply controller or another control device. When the power source is connected to the induction coil a magnetic field is generated across the air gap between the ends of the magnetic core and, when a cartridge case neck is placed in the air gap, the annealing process occurs. The power supply controller may comprise any suitable switching device able to be activated for a desired duration, for example by a microprocessor. Various means suitable for providing a power supply to an induction coil for a desired duration will be appreciated by those skilled in the art and the invention is not limited to any particular manner of doing so.

The predetermined length of time for which the induction coil is connected to the power source can be varied or selected from a number of possible durations based on a user-defined input parameter. The user may set the duration of annealing by selecting a length of time on a suitable interface control, for example by turning a dial to select the required duration setting or by pushing control buttons to set a displayed number of seconds to the required duration. An exemplary control panel 100 is illustrated in FIG. 8.

Cartridge Case Holder

Figure 4:
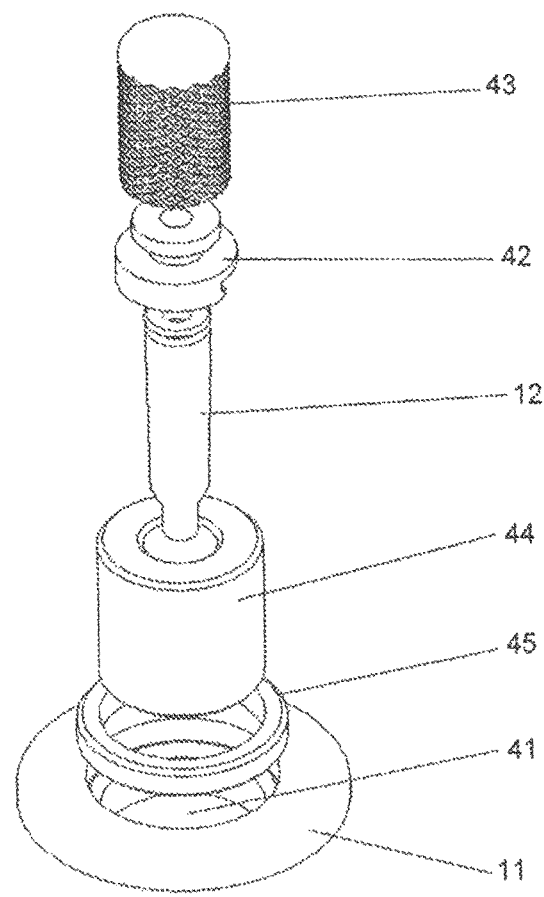
FIG. 4 is an exploded isometric view illustration of the components for holding a cartridge case in position in the annealing apparatus of FIG. 1.
Figure 5:
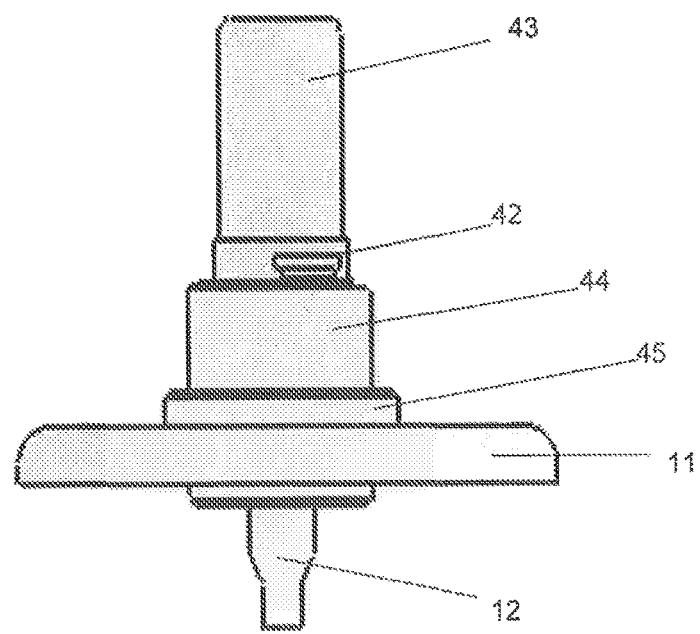
FIG. 5 is a side view illustration of the components for holding a cartridge case in position in the annealing apparatus of FIG. 1.

The induction annealing apparatus 10 comprises a holder to hold the cartridge case 12 in position so that the neck of the case is situated in the air gap between the ends of the magnetic core 13. Any device suitable for holding a cartridge in place may be used. The exemplary case holder shown in the embodiment of FIG. 1 will now be described in more detail with reference to FIGS. 4 and 5, which are an exploded isometric view illustration and a side view illustration respectively of the components for holding cartridge case 12 in position in annealing apparatus 10.

Case 12 is inserted into a hole 41 in housing 11 so that the neck extends inside the housing. As shown in FIG. 1, the magnetic core 13 is positioned directly below the hole in the housing so that the case extends through the hole and into the air gap defined by the magnetic core.

The case holder comprises components for limiting the extent to which the case can be inserted into the hole so that, for a given size of cartridge, the neck is accurately positioned in the air gap in the magnetic core. In the embodiment shown in FIGS. 1, 4 and 5 the case holder comprises a standard shell holder 42 into which the case 12 can be inserted. The shell holder 42 may also be connected to a holding member 43 for being held by a user.

A bushing 44 or other cylindrical member with an axial hole therethrough may be inserted into the hole 41 in the housing. The axial hole in bushing 44 has a width that is large enough to receive a cartridge case to be annealed but small enough to act as a stop against shell holder 42 or holding member 43. Therefore, the length of bushing 44 determines the extent to which the case 12 extends down through hole 41. By altering the length of the bushing, or the height to which it extends above the surface of housing 41, cartridge cases of differing lengths can be accommodated so that any given case can be positioned such that its neck is situated in the air gap defined by the magnetic core.

In one embodiment, bushings of differing lengths may be provided and the bushing of the required length can be selected to suit whatever size cartridge case is to be annealed.

In another embodiment, hole 41 is defined by a port 45 having screw threads on its inner side. The outer surface of bushing 44 may be similarly threaded such that the vertical position of bushing 44 can be adjusted by screwing it within port 45.

The apparatus may comprise both coarse and fine case adjustment mechanisms. For example, bushings of differing lengths may be provided with each of the bushings being screwable in port 45. In this way, a coarse level of height adjustment can be achieved by selecting the bushing of an appropriate length while fine adjustment is achieved by rotating the bushing in the screw.

In further embodiments, the apparatus comprises other case holder adjustment mechanisms. For example, the position of a cartridge holder such as bushing 44 may be moveably mounted on a position adjustment mechanism and its vertical position able to be adjusted by an actuator. The apparatus may comprise a case holder position controller which is operable to control the position of the case holder based on user input, for example by selecting a position setting matching the size of case that is to be annealed.

Annealing Process

An exemplary process of annealing a cartridge case will now be described with reference to the induction annealing apparatus 10 shown in FIG. 1.

Firstly, a cartridge case 12 is selected by a user for annealing. The case 12 will be of a certain type and have a length and a width. The type and/or size of the case is used to determine the required settings of the induction annealing apparatus 10.

The adjustable settings of the induction annealing apparatus 10 may include any one or more of the following: the size of the air gap defined by magnetic core 13; the duration of heating time; and the position of the cartridge case holder relative to the air gap. Any one or any combination of these settings may be adjusted to tailor the annealing process to the cartridge in question.

The correct settings for the above-mentioned variables may be determined in a number of ways. In one embodiment, a look-up table may be provided to the user whereby common types or characteristics of cartridge cases are listed and against each case listing is provided the recommended settings for the induction annealing apparatus. The look-up table may be provided in paper or electronic format, for example it may be available over the internet.

In one embodiment, a user may be able to insert the type or size parameters of the cartridge case into a website. The website outputs the required settings for annealing that case with the induction annealing apparatus. It will be appreciated that the website may also require details of the model or properties of the induction annealing apparatus being used as this may affect the settings to be selected by the user.

Once the user knows which settings need to be used they select the required settings on the user interface or controls of the annealing apparatus, for example via the control panel 100 shown in the embodiment of FIG. 8. In one embodiment, a separate control may be provided for each setting and the user needs to select each one independently. For example, the user would set one control to select the required position of the magnetic core members for the desired air gap, the user would separately adjust the case holder or select the required case holder so that the neck is positioned correctly in the air gap of the magnetic core, and separately again set another control to set the heating time to the required level.

The settings shown on the controls to the user may correspond to the actual parameters being altered or they may be indicative of such. For example, the timer control may indicate "2 seconds", "3 seconds" etc, which corresponds with the heating time and/or to the time for which the induction coil is energised. Alternatively, the timer control may indicate "setting 1", "setting 2", etc, which settings correspond to certain time durations, e.g. setting 1 may correspond to 2.3 seconds.

In another embodiment two or more of these settings are controlled by one or more controllers following a single input from the user. For example, the user may be able to select "setting A" and this may correspond to a certain heating duration and also a certain air gap. In this instance, one or more controllers operate to adjust the magnetic core and also control the duration of heating based on this single setting input.

In one embodiment, the required settings for a given type or size of cartridge case are determined by the induction heating apparatus, by means of a processor or other determination device following input concerning the type or characteristics of case to be inputted to an interface on the apparatus by a user, for example by selecting from one or more drop-down lists of case types I properties. From this information, the processor may automatically determine the required settings of the apparatus and communicate those settings to one or more controllers which are operable to control the respective mechanisms to those settings. Based on the user input, the processor may be able to determine the required settings from data stored in a storage device in the apparatus, or alternatively the processor may be able to access remotely stored data, for example by means of a wireless or wired communication link, or the apparatus may be able to communicate with a remote processing device which determines the required settings and communicates them back to the apparatus.

Either before or after the required settings of the apparatus are determined, the cartridge case 12 is inserted into position in hole 41. The appropriate bushing 44 may be selected so that the neck of the case 12 is positioned in the air gap of the magnetic core 13 and/or the bushing 44 may be screwed so that the case is positioned appropriately.

Once the case 12 has been correctly positioned and the apparatus has been set to operate with the appropriate settings, the activation button 16 is pushed. Another activation button 101 is shown in the embodiment of FIG. 8. In other embodiments, the annealing process is triggered by any appropriate trigger mechanism. This causes the induction coil 14 to be energised for the length of time predetermined by the duration setting selected by the user.

A magnetic field is generated by the induction coil 14 in magnetic core 13 and across the air gap. This magnetic field acts to heat the neck of the case 12 by induction and anneals it. As described above, the configuration of the magnetic core 13 may generate a substantially uniform magnetic field throughout the air gap. This promotes uniform heating across the neck so that the neck is uniformly annealed.

Power Control

In some embodiments of the invention the annealing system/apparatus is configured to be controllable to supply different levels of power to the magnetic coil. This provides another way of varying the amount of annealing in addition to varying the power delivery time and other variables that may be present, depending on the embodiment (for example the size of the air gap).

The level of power supplied to the induction coil in a given amount of time may be varied in any number of ways. For example, the voltage or current of the power supply can be altered by the power controller. The user is able to alter the power supply level by any appropriate means, for example through a control interface by selecting a power level or another setting that corresponds to a power level.

Temperature Control

In another embodiment of the invention, the duration of induction heating of the neck of the cartridge case is governed by the temperature of the cartridge case. If the temperature of the neck is too hot then it may over anneal the neck, thereby rendering it too soft for use. Heat may also be conducted to other parts of the cartridge case, risking annealing those other parts which, as has been described above, may be undesirable.

An induction annealing apparatus may include a temperature sensor configured to monitor the temperature of the cartridge case. While the temperature of any part of the cartridge case may be detected, in particular embodiments it is the temperature of the neck of the cartridge case, i.e. the part of the case being induction heated, that is measured.

Any temperature sensing device able to detect the temperature of the cartridge case may be used. In one embodiment, an infrared temperature sensor may be positioned such that the sensor is aimed at the middle of the air gap in the magnetic core. When a cartridge case is inserted into the apparatus so that the neck is positioned in the air gap, the sensor will detect the temperature of the case neck. For example, the temperature sensor may be fixed to the underside of the case in which the componentry is housed.

Depending on its mode of operation, the temperature sensing device may need to be located sufficiently far from the induction coil and magnetic core to avoid its operation being affected by the magnetic flux generated when the induction coil is activated.

In some embodiments, the temperature sensor is connected to a controller which is able to control the power supply to the induction coil based on the detected temperature. The controller is able to compare the detected temperature to a predetermined maximum or threshold temperature. Once the temperature of the cartridge case neck has reached the threshold temperature, the controller disconnects the induction coil from the power supply to halt the induction annealing process.

The predetermined temperature may be able to be varied either manually by the user or automatically by the controller. Variation in the predetermined temperature may be based, for example, on the diameter of the neck of the cartridge case or any other property of the cartridge case or annealing apparatus. In one embodiment, the apparatus includes a control device able to be adjusted by the user to vary the predetermined threshold temperature before which the annealing process is stopped. In another embodiment the predetermined temperature may be automatically set by the controller based on inputted parameters or from a look-up table based on the type of cartridge.

It will be appreciated that the temperature of the cartridge case may be monitored continuously or repeatedly detected at short time intervals.

In a still further embodiment, the annealing apparatus may include both time and temperature control of the duration of annealing. In such an apparatus, the user may be able to select whether the duration of annealing should be based on time or temperature, or this selection may be made automatically based on certain criteria. The selection assessment may be made in a processor based on parameters of the cartridge and/or apparatus. Alternatively, both time and temperature criteria may be used to stop the annealing process and the process is stopped by the controller which- ever threshold is met first, the time limit threshold or temperature threshold. In another embodiment, where an apparatus can operate on the basis of either time or temperature control, the apparatus may operate on the basis of one control mechanism and the other may act as a failsafe.

Cartridge Case Feeding Assembly

In some embodiments of the invention, the induction annealing system comprises a cartridge case feeding assembly, which is able to feed cartridge cases one at a time into the cartridge case holder of the annealing apparatus. In one embodiment, the cartridge case feeding assembly comprises a mounting for holding the feeding assembly in position on the annealing apparatus. The feeding assembly further comprises a cartridge case repository, in which a plurality of cartridge cases that are to be annealed can be held. A cartridge case movement mechanism can be activated to move the cartridge cases from the repository into position for annealing in the cartridge case holder.

For example, the cartridge case repository may take the form of a trough within which the cartridge cases can be vertically stacked in a row. A conveyor at the bottom of the trough can be activated to move the cases along the trough. The end of the trough is mounted proximate to the cartridge case holder in the annealing apparatus in such a manner that cases pushed out of the end of the trough are inserted into the cartridge case holder.

In another embodiment the cartridge case repository may be positioned above the cartridge case holder so that the cases are able to fall under gravity down into the holder. The cartridges are allowed to move by opening a door at the bottom of the repository, which allows one cartridge case to leave the repository and be guided into position in the cartridge case holder.

It will be appreciated that the cartridge case feeding assembly may operate by automatic or manual means.

Ferrite Stake

In another embodiment of the invention, an induction annealing apparatus includes an elongate member, or stake, formed from magnetic material, such as ferrite, positioned in the air gap defined by the magnetic core. The ferrite stake is oriented perpendicularly to a line between the ends of the magnetic core defining the air gap. The ferrite stake is positioned in such a way that, when a cartridge case to be annealed is inserted into the air gap, the stake projects into the neck of the cartridge case.

It will be appreciated that, in embodiments, in which the housing defines an opening through which the cartridge case can be inserted, the ferrite stake is oriented to point generally in the direction of the opening.

The applicant has found that, when a cartridge case is annealed with a ferrite stake positioned inside the neck, the annealing time is reduced when compared to the equivalent set up without use of the ferrite stake.

In any of the embodiments of the invention the ends of the magnetic core may be shaped to intensify or strengthen the magnetic field generated in the gap between the ends. This may assist with decreasing annealing times or focussing the region of annealing to a specific part of a cartridge. In the embodiment of FIG. 9, for example, the magnetic tips 83, 84 each comprise a bevel so that the area of the end of the magnetic tip is smaller than the cross-sectional area of other parts of the tip. This results in a stronger magnetic field between the parallel end areas of the tips. In other embodiments, the tips may comprise further bevels, chamfers or other shapes.

An induction annealing apparatus or system according to the embodiments of the invention described above is able to anneal the necks of cartridge cases of different types and sizes in a reliable, repeatable and safe manner. The configuration and operation of the apparatus can be accurately set and controlled so that annealing of cases can be consistently repeated. The annealing process can also be performed quickly, reducing the amount of time required to anneal cartridge cases. This is also true for annealing several cases of differing types or sizes since the settings of the apparatus can be quickly and easily changed by the user. By using look-up tables or the like even inexperienced reloaders are able to readily anneal their cases.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

What is claimed is:

1. An apparatus for induction annealing a neck of a cartridge case, the apparatus comprising:
   a magnetic core having a first end and a second end separated by an air gap;
   an induction coil wound around the magnetic core and configured to generate a magnetic field in the magnetic core and the air gap;
   a cartridge case holder for holding the cartridge case such that the neck of the cartridge case is positioned in the air gap, wherein the cartridge case holder comprises a cylindrical member having an axial hole for receiving the cartridge case, the cylindrical member being held in position relative to the air gap such that the length of the cylindrical member determines the position of the neck of the cartridge case in the air gap;
   a power supply controller operable to connect the induction coil to an electric power source according to a selectable setting; and
   shielding positioned adjacent the induction coil to reduce electrical interference.

2. The apparatus of claim 1, wherein the selectable setting comprises one or more from the group consisting of: length of time power is supplied to the induction coil; level of power supplied to the induction coil; a predetermined temperature of the cartridge case.

3. The apparatus of claim 1, further comprising a housing partly accommodating one or more from the group consisting of: the magnetic core, the induction coil, the cartridge case holder and the power supply controller.

4. The apparatus of claim 3, wherein the housing fully accommodates the magnetic core, the induction coil, the cartridge case holder and the power supply controller, and wherein the cartridge case holder comprises a hole in the housing through which the cartridge case is able to be at least partly inserted.

5. An apparatus for induction annealing a neck of a cartridge case, the apparatus comprising:
   an electromagnetic circuit having an induction coil and a power supply controller operable to connect the induction coil to an electric power source according to a selectable setting; and
   a cartridge case holder for holding the cartridge case such that the neck of the cartridge case is positioned to form part of the electromagnetic circuit,
   wherein the cartridge case holder comprises a cylindrical member having an axial hole for receiving the cartridge case, the cylindrical member being held in position in the electromagnetic circuit such that the length of the cylindrical member determines the position of the neck of the cartridge case in the electromagnetic circuit.

6. The apparatus of claim 5, wherein the selectable setting comprises one or more from the group consisting of: length of time power is supplied to the induction coil; level of power supplied to the induction coil; a predetermined temperature of the cartridge case.

7. The apparatus of claim 5, further comprising shielding positioned adjacent the induction coil to reduce electrical interference.

8. The apparatus of claim 5, further comprising a housing partly accommodating one or more of the group consisting of: a magnetic core forming part of the electromagnetic circuit, the induction coil, the cartridge case holder and the power supply controller.

9. The apparatus of claim 8, wherein the housing fully accommodates the magnetic core, induction coil, cartridge case holder and power supply controller, and wherein the cartridge holder comprises a hole in the housing through which the cartridge case is able to be at least partly inserted.

10. The apparatus of claim 5, further comprising a case feeding assembly having:
    a mounting for holding the feeding assembly in position on the apparatus;
    a cartridge case repository for holding a plurality of cartridge cases;
    a cartridge case movement mechanism arranged to move cartridge cases from the repository to the cartridge case holder.

11. The apparatus of claim 10, wherein the cartridge case movement mechanism comprises an opening configured to allow one cartridge case to fall under gravity down to the cartridge case holder.

12. An apparatus for induction annealing a neck of a cartridge case, the apparatus comprising:
    an electromagnetic circuit having an induction coil and a power supply controller operable to connect the induction coil to an electric power source according to a selectable setting;

a cartridge case holder for holding the cartridge case such that the neck of the cartridge case is positioned to form part of the electromagnetic circuit; and a housing fully accommodating the induction coil, the cartridge case holder and the power supply controller, wherein the cartridge case holder comprises a hole in the housing through which the cartridge case is able to be at least partly inserted.

13. An apparatus for induction annealing a neck of a cartridge case, the apparatus comprising:

an electromagnetic circuit having an induction coil and a power supply controller operable to connect the induction coil to an electric power source according to a selectable setting;

a cartridge case holder for holding the cartridge case such that the neck of the cartridge case is positioned to form part of the electromagnetic circuit; and a cartridge case feeding assembly comprising:
- a mounting for holding the cartridge case feeding assembly in position on the apparatus;
- a cartridge case repository for holding a plurality of cartridge cases; and
- a cartridge case movement mechanism arranged to move cartridge cases from the repository to the cartridge case holder.

* * * * *